United States Patent [19]

Smith et al.

[11] Patent Number: 4,992,341
[45] Date of Patent: Feb. 12, 1991

[54] FABRICATION OF DUAL POROSITY ELECTRODE STRUCTURE

[75] Inventors: James L. Smith, Lemont; Eugenia H. Kucera, Downers Grove, both of Ill.

[73] Assignee: The United States of America as represented by the United States Department of Energy, Washington, D.C.

[21] Appl. No.: 260,837

[22] Filed: Oct. 21, 1988

[51] Int. Cl.$^5$ .................. H01M 4/90; C04B 35/02
[52] U.S. Cl. .................. 429/40; 264/117; 264/121; 501/95
[58] Field of Search .......... 501/95; 264/117, 121; 429/40

[56] References Cited

U.S. PATENT DOCUMENTS

| | | | |
|---|---|---|---|
| 4,129,633 | 12/1978 | Biddick | 264/121 X |
| 4,151,235 | 4/1979 | May et al. | 264/13 |
| 4,386,960 | 7/1983 | Iacovangelo et al. | 419/9 |
| 4,407,967 | 10/1983 | Luks | 501/81 |
| 4,410,607 | 10/1983 | Arons et al. | 429/40 |
| 4,526,812 | 7/1985 | Iacovangelo et al. | 427/115 |
| 4,564,567 | 1/1986 | Kucera et al. | 429/41 |
| 4,650,775 | 3/1987 | Hill | 501/95 |
| 4,652,411 | 3/1987 | Swarr et al. | 264/43 |

OTHER PUBLICATIONS

Smith et al., "Progress on Molten Carbonate Fuel Cells Alternative Cathodes", Seminar, 1986.
U.S. patent application Ser. No. 855548, Filed 04/23/86, Kaun.
Lessing, "High Temperature Fuel Cell Research and Development", U.S. Dept. of Energy, 5/1980.
Tressler, "Mechanical Properties of Fibrous Composites", Final Report to MERDI, 3/1980.

Primary Examiner—Stephen J. Kalafut
Attorney, Agent, or Firm—Mark P. Dvorscak; Robert J. Fisher; William R. Moser

[57] ABSTRACT

A substantially entirely fibrous ceramic which may have dual porosity of both micro and macro pores. Total porosity may be 60-75% by volume. A method of spraying a slurry perpendicularly to an ambient stream of air is disclosed along with a method of removing binders without altering the fiber morphology. Adding fine ceramic particulates to the green ceramic fibers enhances the sintering characteristics of the fibers.

29 Claims, 3 Drawing Sheets

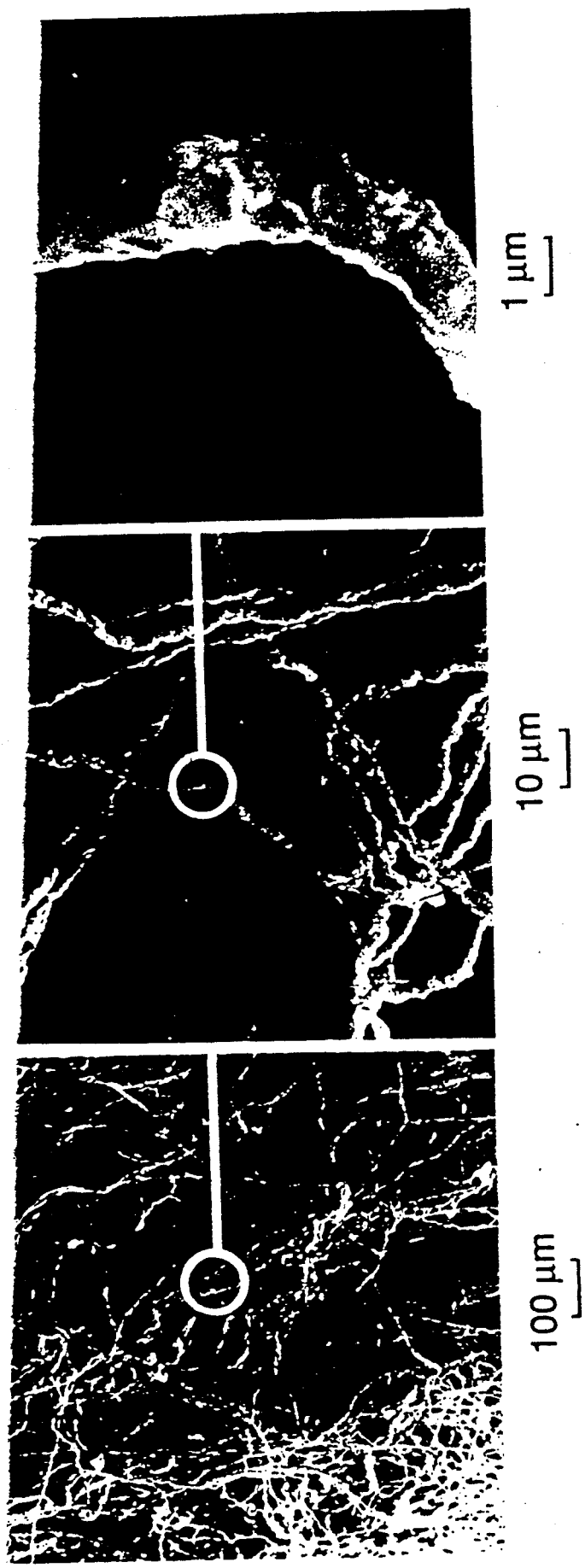

ns has rights in this invention pursuant to Contract No. W-31-109-ENG-38 between the U.S. Department of Energy and Argonne National Laboratory.

FABRICATION OF DUAL POROSITY ELECTRODE STRUCTURE

CONTRACTUAL ORIGIN OF THE INVENTION

The United States Governments has rights in this invention pursuant to Contract No. W-31-109-ENG-38 between the U.S. Department of Energy and Argonne National Laboratory.

BACKGROUND OF THE INVENTION

This invention relates to a process for producing ceramic fibers and structures made with materials produced thereby.

Ceramic fibers have a variety of industrial uses including bioceramics such as bone implants, composite materials useful to enhance the high temperature properties of metals such as aluminum, catalysts, battery separators such as electrolyte supports, high temperature gas filters where porous structures are required to withstand high temperatures and in molten carbonate fuel cells.

Ceramic compositions having chemical stability and electronic conductivity at temperatures in the range of from about 500° C. to about 700° C. are important in the molten carbonate fuel cell. Molten carbonate fuel cells include an anode such as porous nickel, a cathode such as the porous materials disclosed in U.S. Pat. No. 4,574,567 issued Jan. 14, 1986 to Kucera and Smith, the disclosure of which is incorporated herein by reference, and an electrolyte such as combinations of lithium carbonate, potassium carbonate with lithium aluminum oxide particles.

Particularly useful in molten carbonate fuel cells are porous ceramic structures wherein the porous ceramic has a dual porosity. That is the ceramic has both large or macropores and small or micropores. The micropores are used to store electrolyte whereas the macropores are used to permit flow of gases through the cell. In such a ceramic for an electrode, it is desired that the micropores be present in a range of from submicron in size to no greater than about 5 microns. The macropores are preferably in the size range of from about 10 microns to about 150 microns. The macro porosity has been obtained in the prior art with the use of pore formers as shown in the patent in Swarr et al. issued Mar. 24, 1987, U.S. Pat. No. 4,652,411. In the Swarr patent, spherical agglomerates were produced and spray dryed in air at elevated temperatures. Because spherical agglomerates can pack more closely than fibrous agglomerates, the Swarr et al. method required the use of pore formers in order to provide the required macro porosity for use in a molten carbonate fuel cell. Pore formers are disadvantageous because they may leave residue and they do not always result in interconnected pores adequate for conducting gases through the structure.

Heretofore, ceramic fibrous materials have not been made without inclusion of a substantial majority of particulates. For instance, Paul A. Lessing reported in the paper entitled "High Temperature Fuel Cell Research And Development" published May, 1980, by The Montana Energy and MHD Research and Development Institute, Inc., a fibrous ceramic material. However, upon later testing by Professor R.E. Tressler, his photomicrographs show that the material was only 10% or less fibrous and the balance being bonded particulate material of random agglomerates. The present invention reverses the ratios, resulting in material which is more than 95% fibrous, that is substantially entirely fibrous.

Accordingly, it is a principal object of the present invention to provide a method of making ceramic fibers and the various products produced thereby.

Another object of the invention is to develop ceramic compositions useful in forming electrodes for molten carbonate fuel cells and particularly cathodes requiring dual porosity.

SUMMARY OF THE INVENTION

Briefly, the invention relates to fibrous ceramic materials and the method of making same. The ceramics are formed as fibers in which each fiber is comprised of a plurality of particulate material such that the fiber has micropores therein. The micropores can be varied in size depending upon the size of the particulates used to make the fibers but in general, are less than about 5 microns. After the fine ceramic fibers are made, the length of the fibers can be controlled or adjusted and thereafter formed into a predetermined shape while green. Thereafter, the green ceramic fibers in the predetermined shape can be sintered with or without the addition of ceramic fines to provide the desired end product. The inventive method of making the fibers include providing a rapidly flowing stream of ambient air and introducing a slurry or slip of the ceramic material in a direction normal or perpendicular to the air flow.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

FIGS. 2A, 2B and 2C are photomicrographs of green ceramic fibers at three different magnifications; and FIGS. 3A, 3B and 3C are photomicrographs of sintered ceramic fibers at three different magnifications.

DETAILS DESCRIPTION OF THE PREFERRED EMBODIMENT

Figure 1:
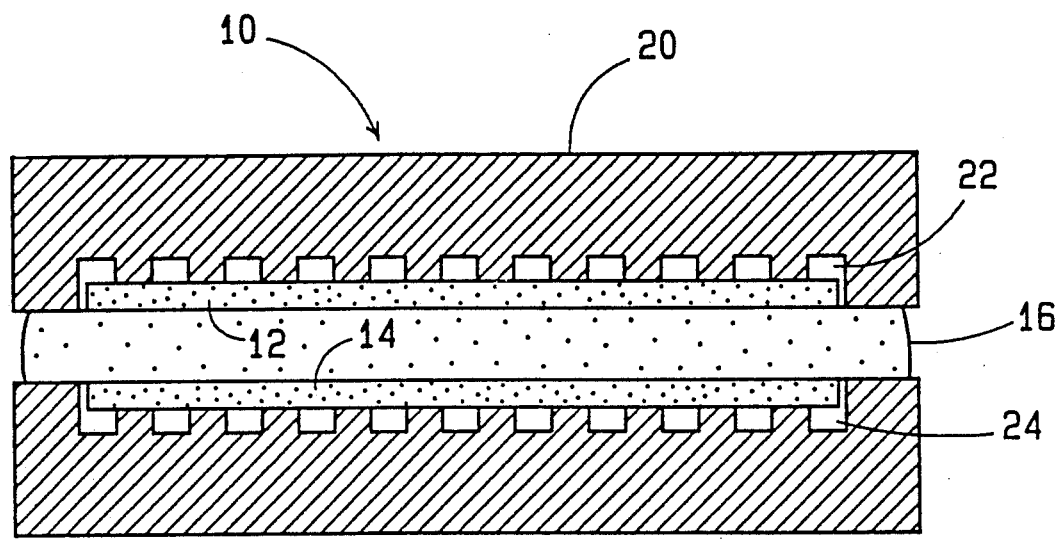
FIG. 1 is a cross-sectional view of a molten carbonate fuel cell incorporating one embodiment of the invention.

FIG. 1 is a representative fuel cell incorporating one use of the invention. As illustrated, fuel cell 10 includes a porous cathode 12 which may be made from any of the various materials disclosed in the '567 patent. Preferably, the electrode 12 is lithium manganate doped with a metal selected from magnesium, niobium, aluminum and iron or lithium ferrite doped with a metal selected from manganese, cobalt and copper. The fuel cell 10 also includes a porous anode 14 of nickel separated by a tile 16 containing a mixture of lithium carbonate and potassium carbonate electrolyte. The electrolyte typically has particles such as lithium aluminate distributed therethrough and the size of the particles may be varied, as is well known in the art.

Typically, the cathode 12 has a dual porosity with macropores having sizes in the range of from about 10 to about 150 microns and micropores having sizes from submicron up to about 5 microns in diameter. As is well known, the micropores must be sized in relation to the electrolyte so as to ensure that the electrolyte floods the micropores in the cathode 12. Representative thicknesses for the cathode 12, the anode 14 and the tile 16 are respectively about 0.015, 0.030 and 0.02 to about 0.07 inches. These components are typically held in a stainless steel housing 20 provided with slots 22 and 24 for carrying oxidant gas and fuel gas to the cathode and the anode, respectively.

The ceramic fibers in general are made by preparing a binder and dissolving it in a suitable solvent. Typical binders used are acrylic binders or a binder sold by Monsanto identified as BUTVAR®B-76 Polyvinyl Butyrol which is a terpolymer of polyvinyl butyral, polyvinyl acetate. Other binders well known in the art may be substituted for the BUTVAR®B-76. The binder is dissolved in the solvent having such as acetone, MEK or a toluene/ethanol mixture. The preferred solvent is MEK but in some respects the end use of the fibers dictates the selection of the solvent. For tape casting, a 70/30 weight percent ethanol/toluene has been found to be preferable.

A slurry of the solvent and the binder is prepared. Since the Monsanto acrylic binder dissolve slowly in MEK, addition of the solid BUTVAR®-B-76 binder to solvent at a weight ratio of 0.25/1.0 was made by slow mixing in order to obtain full dissolution. The ceramic is milled by usual methods such as vibratory milling with zirconia balls with a small amount of solvent and dispersant along with a small quantity of the predissolved binder in order to prepare the ceramic to the required particle size. It is preferred that the ceramic be milled until it is submicron in size. A Solsperse dispersant is used in combination with MEK and the small amount of the predissolved binder during the ball milling of the ceramic solids. Solsperse® is a registered trademark of ICI Americas, Inc. and is a well known dispersant. Any art recognized dispersant may be used, such as those containing fish oils or their equivalent. Milling, depending upon the starting material, may take as long as ninety-six hours. Thereafter, a slurry is formed and sprayed into a column of moving gas, preferably air, at ambient temperatures. It has been found that the direction of the slurry spray with respect to the direction of the moving gas is critical. It is required for good results that the slurry be sprayed in a direction substantially perpendicular to the gas stream. If the spray is parallel to the direction of the gas stream, bead like material is formed rather than fibers. A disposable mesh screen (not shown) is used to collect the fibers produced by the spraying process. These green fibers which still have binder thereon, may be formed into any predesired shape.

As an example:
100 g $LiFeO_2$ is to be sprayed.
Total Monsanto B76 mass = 19.85 g.
Volume MEK = 90 cc, added during first milling.
Solsperse Mass = (1%)(100 g) = 1 g
1st Step:
 Make predissolved binder, 19.85 g B76 +
 80 g MEK. Ball mill slowly about 24 h.
2nd Step:
 Mix 100 g $LiFeO_2$
 1 g Solsperse
 33 g predissolved binder
 90 cc MEK
 Mill for specified time of about
 65 h.

3rd Step:
 Add 67 g predissolved binder
 Mill about 24 h.
4th Step:
 Spray at about 3.3 cc/min slurry and
 about 100 L/min air flow.

The above example and others like it produced fibrous ceramic material wherein more than about 95% of the material was fibrous whereas the MERDI material was less than about 10% fibrous, the remainder being random agglomerates. Sintering of fibers produced by the method of the invention has been found to be difficult and requires care so as not to ruin the fibers thus produced. It has been found that normal heating of the fibers coated with the binder destroys the ceramic fibers. Rather, it has been found that there are two acceptable methods for removing the binder from the green material.

In the first case, an oven is preheated to approximately 400° C. and the materials inserted into the oven in order to flash burn the binder. In another instance, the green ceramic with the binder is heated to a temperature in the range of from about 100° C. to about 200° C. and held for a prolonged period of time such as 12-24 hours in order to partially decompose the binder. Traditional heating by putting the green material with the binder into an oven and bringing the oven up to temperature as is typical, destroys the fibers and results in a rubble, not a fibrous product.

Because of the nature of the sintered fibers, the fibers do not sinter well into a structure. This is, it is believed, due to the fact that the fibers are somewhat crinkly and have poor packing properties. Of course, it is the poor packing properties that make the fibers desirable for a dual porosity cathode because the poor packing of the fibers results in the connected macropores required for a dual porosity cathode. In order to enhance the sintering characteristics of fiber ceramics without destroying the interconnected macro porosity, it has been found that the addition of ceramic fines to the fibers enhances significantly the sintered properties of the fibers without destroying the required porosity. Typically, the ceramic fines added are submicron in size and are added in a weight ratio of ceramic fibers to particles in the range of from about 2.5/1 to about 5/1 fiber to particle.

Because the ceramic fibers produced by the method herein described tend to be long, the fibers must be shortened where thin sheets of ceramic materials are desired to be fabricated. Accordingly, it has been found that the ceramic fibers can be chopped in a liquid medium such as water without destroying the basic nature of the fiber. Ball milling ceramic fibers tends to break the fibers into particles. An ordinary Osterizer type of machine can be used to chop fibers to desired lengths. It is understood that the fibers upon chopping in a liquid medium will have a size range and for a molten carbonate fuel cell cathode, it is desired that the ceramic fibers be less than 100 microns in length.

After the ceramic fibers have been chopped to an appropriate length and dried, the fibers are thereafter stirred into a prepared slip and cast onto a suitable release surface. The slip including ceramic particles is prepared previously in a manner well known in the tape casting art. It is understood that by adjusting the ratio of ceramic particulates to ceramic fibers, the ultimate small to large pore ratio can be adjusted. Typical electrode porosity is 60-75% by volume and electrodes having this overall porosity have been produced using the ceramic fibers of this invention.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. An electrode for a molten carbonate fuel cell, comprising a substantially fibrous, dual porosity structure of randomly positioned electrode-active ceramic fibers.

2. An electrode for a molten carbonate fuel cell, comprising a dual porosity structure of randomly positioned electrode-active ceramic fibers, further comprising ceramic fine particles sintered to said ceramic fibers.

3. The electrode for a molten carbonate fuel cell of claim 2, wherein said electrode is a cathode and said electrode-active ceramic fibers are $Li_2MnO_3$ doped with an ion of Mg, Nb, Al and Fe or $LiFeO_2$ doped with an ion of Mn, Co and Cu.

4. The cathode of claim 2, wherein the weight ratio of ceramic fibers to ceramic particles is from about 2.5 to 1 to about 5 to 1, and said ceramic particles are substantially submicron in size.

5. The cathode of claim 2, wherein substantially all of said fibers have an effective length of less than about 100 microns and diameters of less than about 10 microns.

6. The cathode of claim 4, wherein said ceramic fibers have pore sizes sufficiently small to flood upon contact with an alkali metal carbonate electrolyte suitable for a molten carbonate fuel cell and the pores between said ceramic fibers are sufficiently large to pass an oxidant gas therethrough.

7. The electrode for a molten carbonate fuel cell of claim 1, wherein the structure has macropores in the range of about 10 microns to about 150 microns, and micropores in the range of from submicron to about 5 microns.

8. The electrode for a molten carbonate fuel cell of claim 1, wherein said electrode is an anode.

9. A method of forming ceramic fibers comprising: providing a slurry of fine ceramic particles and liquid carrier including a binder material and solvent, forming ceramic fibers from the slurry by spraying the slurry into a moving stream of gas, and treating the ceramic fibers formed from the slurry to remove the carrier.

10. The method of claim 9, and further including the step of forming the ceramic fibers into a predetermined shape and wherein the solvent is removed by evaporation.

11. The method of claim 10, wherein the carrier is removed without altering the morphology of the fibers.

12. The method of claim 11, wherein the carrier is removed by flash burning.

13. The method of claim 11, wherein the binder material is partially decomposed by maintaining the ceramic fibers at an elevated temperature below the melting point of the binder for a prolonged period of time.

14. The method of claim 9, wherein the gas is air at ambient temperature and the slurry is sprayed into the gas stream in a direction substantially perpendicular to the direction of gas flow.

15. A method of forming a thin porous sheet of ceramic material comprising: providing a slurry of fine ceramic particles and liquid carrier including a binder material, forming ceramic fibers from the slurry, calcining the ceramic fibers formed from the slurry at a sufficient temperature to drive off the binder, modifying the length of the ceramic fibers to a predetermined range, forming a slip of the ceramic fibers of modified length in a liquid carrier including a binder material and additional fine ceramic particles, spreading a thin layer of the slip onto a substrate, and heating the slip to sintering temperatures to form a porous sheet of ceramic material.

16. The method of claim 15, wherein the weight ratio of ceramic fibers to fine ceramic particles is in the range of from about 2.5 to 1 to about 5 to 1.

17. The method of claim 15, wherein the fine ceramic particles in the slurry have diameters up to about 1 micron.

18. The method of claim 15, wherein the fibers are formed by injecting the slurry into a stream of air at ambient temperatures in a direction substantially perpendicular to the direction of flow of the airstream.

19. The method of claim 15, wherein the lengths of the fibers are modified by chopping in a liquid medium.

20. The method of claim 15, wherein the lengths of the fibers are modified to be shorter than the thickness of the thin porous sheet.

21. A fuel cell comprising a fuel electrode and an oxidant electrode and an electrolyte disposed between the electrodes, said oxidant electrode comprising randomly positioned ceramic fibers of a cathode-active material and fine ceramic particles sintered to said ceramic fibers, said oxidant electrode having dual porosity of micropores less than 5 microns and macropores greater than 10 microns, said electrolyte containing an alkali metal carbonate and particles distributed therethrough having sizes to ensure flooding of the micropores of the oxidant electrode with the electrolyte.

22. The fuel cell of claim 21, wherein the cathodeactive material is selected from $Li_2MnO_3$ doped with an ion of Mg, Nb, Al and Fe and $LiFeO_2$ doped with an ion of Mn, Co and Cu.

23. The fuel cell of claim 21, wherein the weight ratio of ceramic fibers to fine ceramic particles in the oxidant electrode is in the range of from about 2.5 to 1 to about 5 to 1.

24. The fuel cell of claim 21, wherein the size of the oxidant electrode micropores are in the range from submicron to less than about 5 microns and the sizes of the macropores are in the range of from about 10 microns to about 150 microns.

25. The fuel cell of claim 21, wherein the electrolyte is a mixture of $Li_2CO_3$ and $K_2CO_3$ the particles distributed therethrough are $LiAlO_2$.

26. A ceramic material wherein more than 50 percent by weight of the ceramic is present as fibers having a porosity of 60%-75% by volume.

27. The ceramic material of claim 26, wherein at least 90 percent by weight of the ceramic is present as fibers.

28. The ceramic material of claim 26, wherein the material includes submicron ceramic particles present in an amount up to about 40% by weight.

29. The ceramic material of claim 26, wherein the ceramic is selected from the group consisting of $Li_2MnO_3$ doped with an ion of Mg, Nb, Al and Fe and $Li_2FeO_2$ doped with an ion of Mn, Co and Cu.

* * * * *